United States Patent [19]
Pollock

[11] 3,751,914
[45] Aug. 14, 1973

[54] PROCESS AND APPARATUS FOR IMPROVING THE REMOVAL OF HARMFUL COMPONENTS FROM ENGINE EXHAUST GASES

[75] Inventor: Lyle W. Pollock, Bartlesville, Okla.

[73] Assignee: Phillips Petroleum Company, Bartlesville, Okla.

[22] Filed: Sept. 27, 1971

[21] Appl. No.: 183,886

[52] U.S. Cl. .................................................. 60/284
[51] Int. Cl. ............................................ F02b 75/10
[58] Field of Search ..................... 60/303, 284, 286, 60/300

[56] References Cited
UNITED STATES PATENTS

| | | | |
|---|---|---|---|
| 2,806,346 | 9/1957 | Clayton | 60/284 |
| 3,020,903 | 2/1962 | Kloss | 60/284 |
| 2,937,490 | 5/1960 | Calvert | 60/284 |
| 3,226,206 | 12/1965 | Hettick | 60/286 |
| 3,254,483 | 6/1966 | Martin | 60/303 |
| 3,273,971 | 9/1966 | Baddorf | 60/284 |

FOREIGN PATENTS OR APPLICATIONS

| 1,308,736 | 10/1962 | France | 60/284 |
|---|---|---|---|

Primary Examiner—Douglas Hart
Attorney—Young and Quigg

[57] ABSTRACT

In the operation of an internal combustion engine, the catalyst bed of a catalytic muffler can be brought more rapidly to its effective operating temperature during the warmup period by combining, just after the engine start-up, the exhaust gases with air and unburned fuel, igniting the mixture and passing the hot combustion products in direct heat exchange with the cold catalyst bed. The process is interrupted when a period of time has elapsed so that a portion of the catalyst bed has been elevated to a temperature sufficiently high so as to be effective.

A catalytic muffler equipped with an interconnected combustion chamber and catalyst-containing chamber may be used for the above purpose. The combustion chamber is provided with an inlet for a mixture of air, supplied by a blower, and exhaust gases, means for injecting unburned fuel as a spray, and means for igniting the combination of air, exhaust gases and unburned fuel. Suitable timing means are provided for initiating and terminating the operation of the blower, injection means and ignition means.

5 Claims, 2 Drawing Figures

INVENTOR.
L. W. POLLOCK

PROCESS AND APPARATUS FOR IMPROVING THE REMOVAL OF HARMFUL COMPONENTS FROM ENGINE EXHAUST GASES

BACKGROUND OF THE INVENTION

This invention relates to a process and apparatus for the removal of harmful substances from the exhaust gases of internal combustion engines. In another aspect, it relates to a process and apparatus for catalytically oxidizing to harmless materials the products of incomplete combustion that contaminate the exhaust gases of internal combustion engines. In still another aspect, it relates to a process and apparatus for bringing more rapidly to its effective operating temperature the catalyst bed of a catalytic muffler system of an internal combustion engine.

In the operation of an internal combustion engine such as the type used on automobiles, the combustion process in the cylinders of the engine produces from the hydrocarbon fuel some products of incomplete combustion. These products include, among others, carbon monoxide and unburned hydrocarbons. Unless further steps are taken these products are exhausted to the air where they contribute to air pollution.

Generally speaking, the generation of these materials is greatest when a cold engine is started and is operated with the choke on. For a short period of time after starting a cold engine, the hydrocarbon and carbon monoxide emissions are several times greater than such emissions from a hot engine operating at the same speed and load. The high rate of hydrocarbon and carbon monoxide emissions during the warm-up period is a major problem in trying to meet federal emission standards established for the 1975 vehicles.

The generation of these emissions also tends to increase when the engine is not in good repair. Thus older automobiles and those not operating at peak efficiency, i.e., "out of tune" are the worst offenders.

A method devised for ameliorating this problem involves directing the exhaust gases through a muffler which contains a bed of catalyst of a type that will oxidize the harmful carbon monoxide and hydrocarbons to an innocuous mixture of water and carbon dioxide. To be effective the catalyst bed must be brought to a temperature at which the oxidation of carbon monoxide and unburned hydrocarbons will occur. Although this temperature will vary depending upon the nature of the catalyst, generally at least about 600°F. is required. Therefore, immediately after startup of the engine and for a period of time thereafter, until the exhaust gases gradually raise the catalyst bed to its effective temperature, the harmful components in the exhaust gases pass through the catalyst bed and are discharged unchanged to the atmosphere.

In view of the delay between engine startup and the time when the catalyst bed reaches its operating temperature, it can be seen that engine emissions and concomitantly air pollution can be reduced if a method can be devised for more quickly raising the catalyst bed to a sufficiently high temperature for it to operate effectively.

SUMMARY OF THE INVENTION

An object of this invention is to reduce or eliminate harmful components found in the exhaust gases of internal combustion engines.

Yet another object of this invention is to provide a process and apparatus for more rapidly bringing the catalyst bed of a catalytic muffler to its effective operating temperature so as to minimize the discharge to the atmosphere of unchanged contaminants in the exhaust gases of an internal combustion engine.

In accordance with this invention a process is provided which comprises combining, just after startup, the exhaust gases from an internal combustion engine with air and unburned fuel and igniting the mixture to form hot combustion gases. These gases are conducted, in direct heat exchange, through the cold catalyst bed of a catalytic muffler so as to more rapidly raise its temperature to a level at which it can operate effectively.

Further, in accordance with this invention, there is provided an apparatus for improving the operation of a catalytic muffler system designed for removing harmful contaminants from the exhaust gases of an internal combustion engine comprising a catalytic muffler having a catalyst-containing chamber and a combustion chamber in combination with means to provide a mixture of air, exhaust gases, and unburned fuel to the combustion chamber wherein means are provided to ignite the mixture and conduct the gases from the resulting combustion into the catalyst-containing chamber. Additional means are provided to initiate and terminate the operation of the mixing and ignition means.

DESCRIPTION OF PREFERRED EMBODIMENTS

Although this invention can be applied to a wide variety of power systems using internal combustion engines, for the purposes of its illustration it will be described as being employed in conjunction with an engine used to power an automobile. However, as will be appreciated by one skilled in the art, it need not be limited thereto.

Figure 1:
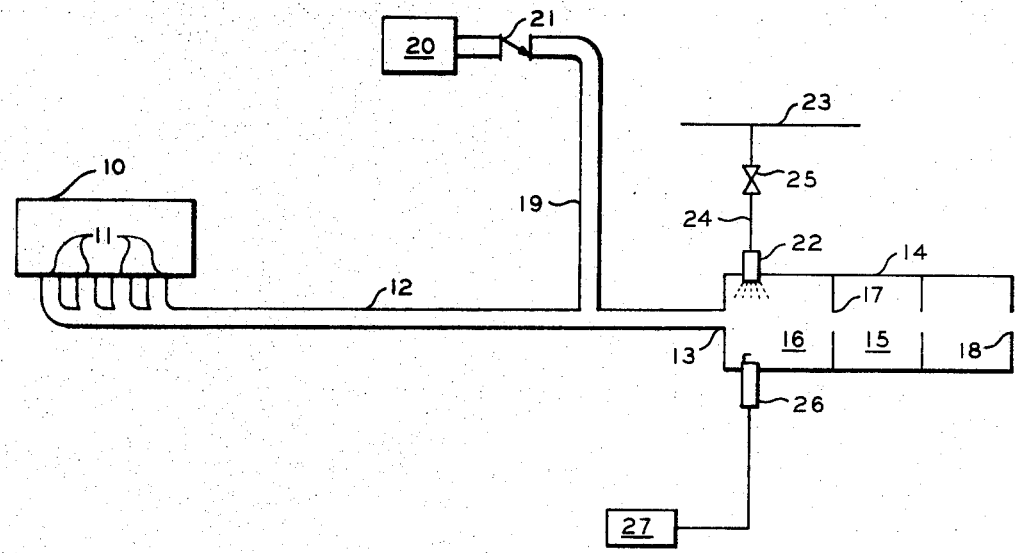
FIG. 1 is a cross section view of the apparatus of this invention.

Referring to the drawing and specifically to FIG. 1, the numeral 10 represents an internal combustion engine of the type used in a conventional automobile. Operation of the automobile generates exhaust gases which are transferred from the engine through manifold exhaust system 11. These exhaust gases are channeled through conduit 12 into a catalytic muffler 14 through inlet 13. Catalytic muffler 14 is any of a conventional type used to muffle the sound of the engine and to catalyze the oxidative conversion of the undesirable products of incomplete combustion present in the exhaust gases to harmless substances. These contaminants are comprised of carbon monoxide and unburned hydrocarbons that are oxidized to carbon dioxide and water during their passage through catalyst bed of catalyst-containing chamber 15. Typical catalyst materials useful in these catalytic mufflers are the metals of groups I, V, VI, and VIII of the periodic table or the corresponding oxides. Suitable materials are metals such as vanadium, chromium, manganese, iron, cobalt, nickel, copper, molybdenum, palladium, platinum, titanium, tin, their oxides or mixtures thereof. To improve their effectiveness, the catalyst metals or metal oxides can be coated on or impregnated in a suitable support material. These support materials are usually selected from inorganic refractory oxides such as silica, alumina, calcined diatomaceous earth, kiselguhr and the like. The catalyst particles may be of a variety of shapes including spherical, cylindrical and other regular shapes as well as irregular shapes. Particle size may vary also. Generally a size and shape are selected to maximize contact of the exhaust gases with the catalyst surface without unduly impeding flow through the bed of material.

The muffler 14 is modified by including a combustion chamber 16 between inlet 13 and the remaining portion of muffler 14. The combustion chamber is in open communication with the rest of the muffler 14 through communication means 17 which may be of any suitable type such as a conduit, foraminous screen or the like. After their passage through the catalyst bed, exhaust gases are transmitted from muffler 14 to the atmosphere through exit port 18.

Conduit 12 is intersected prior to inlet 13 by auxiliary air supply line 19 through which air can be directed from air blower 20 through check valve 21 into conduit 12 where it can mix with exhaust gases. Air blower 20 may be of any suitable type but a centrifugal pump capable of supplying up to 100 cubic feet per minute is preferred. Check valve 21 is disposed so as to be open during the operation of air blower 20 but otherwise to be closed in order that exhaust gases will not be able to escape by passing through the blower 20 when it is not in operation. Air blower 20 derives its power from the electrical system of the engine as will be shown hereinafter.

Injection means 22 are provided to introduce unburned fuel as a spray to combustion chamber 16. The unburned fuel for injection is taken from fuel line 23 after passing through the fuel pump (not shown) by means of feeder line 24. A valve 25, preferably a solenoid valve, is provided to control the flow of fuel to the injection means 22. The operation of this valve can be made automatic as will be described hereinafter. The operation of the fuel pump provides the required pressure for the spray.

A means 26 is provided for igniting a mixture of air, exhaust gases and unburned fuel in combustion chamber 16. Any means suitable for this purpose may be employed but a spark or glow plug is preferred because of the ready availability of electrical power from the auto electric system represented by battery 27.

Figure 2:
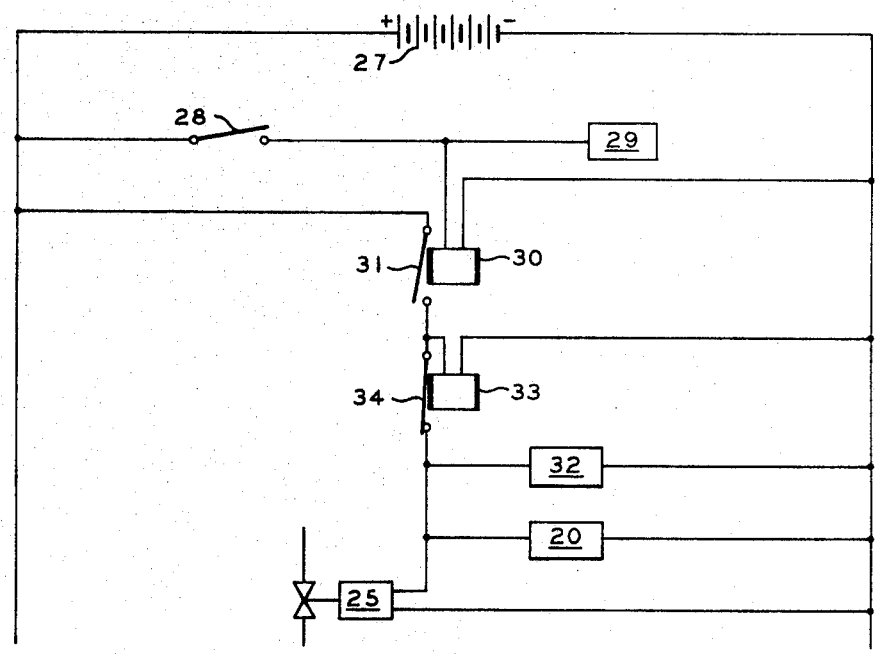
FIG. 2 is a schematic of an electrical control circuit of this invention.

Referring now to FIG. 2 which represents an electrical control system that may be used to this invention, battery 27 is represented as a 12 volt storage battery of the type that is used in automobiles. In the operation of this invention closing the ignition switch 28 (shown in open position) will not only activate the main ignition system 29 (designated on the drawing but not shown in detail) and start the engine but will also energize coil 30. Coil 30 operates to close delay switch 31 (shown in open position). After the preset delay period elapses, switch 31 closes, completing the circuit that provides power to air blower 20, opens solenoid valve 25 and energizes igniter circuit 32 for ignition means 26. Additionally, coil 33 is energized which operates to open delay switch 34 (shown in closed position). When the preset delay period for switch 34 has elapsed, it opens, thereby breaking the circuit that operates the ignition circuit 32, solenoid valve 25 and air blower 20. When the operation of the engine itself is terminated, switch 31 returns to an open position while switch 34 returns to its closed position in order that the cycle may be repeated when the engine is restarted at a later time.

The circuit of FIG. 2 also serves the remainder of the automobile electrical system, including lights, windshield wipers, power seat, and other accessories, although details are not shown on the drawing.

A delay switch suitable for use in this invention is Square D class 8501 type GDO-11-GE DC control relay with 12 volt operating coils and pneumatic timers adjustable from 0.2 second to 1 minute (accuracy ± 15 percent) which is commercially available from the Square D Company, Park Ridge, Ill.

In the actual practice of this invention, the purpose for setting delay switch 31 to close after the closing of ignition switch 28 is to allow the engine startup sequence to have at its disposal essentially all the electrical power that battery 27 can deliver. As will be appreciated by one skilled in the art, the drawing off of electrical power from the battery to operate auxiliary systems can hamper or defeat the engine startup process. This problem is most severe during cold weather, when the battery is old or the engine difficult to start for reasons of mechanical defect or a combination of these. The timer for this delay switch may be set for any period of time sufficient to insure that startup will be satisfactory. However, in order to minimize the period after startup when the apparatus of the invention is not operating, a delay of about 2 seconds is preferred.

It is within the spirit of this invention to use any other suitable means that will automatically initiate and terminate the operation of air blower 20, valve 25 and ignition means 26.

In the actual operation of this invention, startup of the engine 10 results in the generation of exhaust gases. These gases are led from the engine through exhaust manifold 11 and conduit 12. After a 2 second delay, as provided by the electrical circuitry of FIG. 2 and described above or other suitable means, air blower 20 begins to operate with the simultaneous opening of check valve 21. The flow of air generated passes through auxiliary air supply line 19 and is combined in conduit 12 with a stream of exhaust gases. This mixture enters combustion chamber 16 through inlet 13 where it is combined with a spray of unburned fuel supplied from fuel line 23 through valve 25, feeder line 24 and spray injection means 22. The rate of unburned fuel delivery may vary but generally about 0.1 to 1 cc of liquid fuel per second will be adequate.

The mixture of air, exhaust gases and unburned fuel is ignited by ignition means 26. The resulting combustion generates high temperature gases which pass through communication means 17 and into catalyst-containing chamber 15. The high temperature gases, by direct heat exchange, elevate the temperature of the initially cold catalyst bed in chamber 15 and after passage through it are exhausted from the muffler 14 to the air through exit port 18.

The termination of the operation of the air blower 20 and ignition means 26 and the closing of valve 25 to stop the flow of unburned fuel is controlled by the opening of delay switch 34 as shown in FIG. 2. The opening of this switch is delayed for a period of time sufficient to allow the high temperature gases to elevate the temperature of the leading edge of the catalyst bed in chamber 15 to a level at which the catalyzed oxidation of hydrocarbons and carbon monoxide will occur. Generally this will require a delay of from about 8 to 30 seconds after the initial closing of delay switch 31 initiates the operation of the components just described. However, a delay of from about 10 to 20 seconds will be sufficient for most catalytic mufflers, depending upon the nature of the catalyst bodies used, size and design of the muffler, etc.

Once the leading edge portion of the catalyst bed in chamber 15 has been raised to its effective operating temperature, catalytic oxidation of exhaust components will add heat to the exhaust stream and assist in elevating the temperature of the remainder of the bed.

From the foregoing description it can be seen that by employing this invention the period of time during engine warmup when a catalytic muffler is inoperative because of the low temperature of the catalyst bed can be reduced.

I claim:

1. A process for rapidly bringing to its operating temperature the catalyst bed of a catalytic muffler, said catalytic muffler being disposed so as to treat the exhaust gases from an internal combustion engine, comprising the steps:
   a. initiating ignition of said internal combustion engine, said ignition automatically initiating a predetermined delay interval before
   b. automatically mixing the exhaust gases from said internal combustion engine with air and unburned fuel and igniting said mixture for a predetermined period,
   c. conducting the gaseous combustion products resulting from said ignition and direct heat exchange with said catalyst bed, and
   d. automatically terminating mixing the exhaust gases from said internal combustion engine with air and unburned fuel and terminating igniting said mixture at the end of said period.

2. The process according to claim 1 wherein the mixing of said exhaust gases with air and unburned fuel and subsequent ignition is conducted for a period of from 8 to 30 seconds.

3. A process according to claim 1 wherein the air is combined with said exhaust gases prior to the combination with the unburned fuel.

4. An apparatus for eliminating the products of incomplete combustion in the exhaust stream of an internal combustion engine comprising:
   a. a catalytic muffler for converting the products of incomplete combustion from said engine to harmless materials, having a combustion chamber and a catalyst containing chamber,
   b. inlet means to said combustion chamber for introducing exhaust gases from said engine,
   c. means for compressing air and mixing said air with said exhaust gases prior to said inlet means,
   d. means for injecting unburned fuel into said combustion chamber as a fine spray,
   e. means for igniting a mixture of said unburned fuel, air and exhaust gases,
   f. communication means between said combustion chamber and said catalyst containing chamber,
   g. exit means for passing gaseous products from said catalyst containing chamber to the atmosphere,
   h. means for initiating the operation of said air compressing means, said spray injecting means and said igniting means said initiating beginning automatically after a predetermined delay interval after startup of said engine, and
   i. means for automatically terminating the operation of said air compressing means, said spray injecting means and said igniting means after a predetermined interval of operation after startup of said engine.

5. An apparatus according to claim 4 wherein said initiating and terminating means are delay switches, said compressing means is a centrifugal blower, said injection means is controlled by a fuel metering valve and said ignition means is a spark plug.

* * * * *